US010563782B2

(12) United States Patent
Moore (10) Patent No.: US 10,563,782 B2
(45) Date of Patent: Feb. 18, 2020

(54) TIRE VALVE ASSEMBLY (71) Applicant: THE LEGION ENGINEERING CORPORATION, Changhua (TW)

(72) Inventor: Wayne-Ian Moore, Changhua (TW)

(73) Assignee: The Legion Engineering Corporation, Changhua, Changhua County (TW)

( * ) Notice: Subject to any disclaimer, the term of this patent is extended or adjusted under 35 U.S.C. 154(b) by 11 days.

(21) Appl. No.: 16/016,835

(22) Filed: Jun. 25, 2018

(65) Prior Publication Data
US 2019/0390785 A1 Dec. 26, 2019

(51) Int. Cl.
*F16K 15/20* (2006.01)
*B60C 29/00* (2006.01)
*B60C 29/04* (2006.01)

(52) U.S. Cl.
CPC ............ *F16K 15/20* (2013.01); *B60C 29/005* (2013.01); *B60C 29/04* (2013.01); *F16K 15/205* (2013.01); *Y10T 137/3584* (2015.04); *Y10T 137/3646* (2015.04); *Y10T 137/374* (2015.04); *Y10T 137/3786* (2015.04)

(58) Field of Classification Search
CPC ....... F16K 15/20; F16K 15/205; B60C 29/04; B60C 29/005; B60C 29/002; B60C 29/20; B60B 25/22; Y10T 137/3584; Y10T 137/3646; Y10T 137/374; Y10T 137/3786
USPC .......... 152/415, 427, 429, DIG. 11, DIG. 16; 251/267, 273, 274
See application file for complete search history.

(56) References Cited

U.S. PATENT DOCUMENTS

| 565,573 | A | * | 8/1896 | Schrader | ................. | B60C 29/04 |
| | | | | | | 152/430 |
| 628,617 | A | * | 7/1899 | Warner | .................... | B60C 29/02 |
| | | | | | | 152/427 |
| 966,023 | A | * | 8/1910 | Keller, Jr. | ............... | B60C 29/04 |
| | | | | | | 152/429 |
| 3,489,166 | A | * | 1/1970 | Williams | ................ | F16K 15/20 |
| | | | | | | 137/234.5 |
| 8,646,477 | B2 | * | 2/2014 | Wen | ...................... | B60C 29/005 |
| | | | | | | 137/223 |
| 2013/0186536 | A1 | * | 7/2013 | Lee | .......................... | B60C 29/02 |
| | | | | | | 152/427 |
| 2018/0333997 | A1 | * | 11/2018 | Vargus | .................... | B60C 29/02 |

* cited by examiner

*Primary Examiner* — Craig J Price
(74) *Attorney, Agent, or Firm* — Rosenberg, Klein & Lee (57) ABSTRACT

A tire valve assembly includes a valve shaft movably inserted into a first diameter section of the outer tube. The valve shaft includes a passage and a radial hole which communicates with the passage. A first seal is mounted to the end of the valve shaft that is inserted into the outer tube and is movable relative to a shoulder in the outer tube. A guide tube is mounted to the valve shaft and has a guide portion protruding therefrom which is guided in guide groove in the outer tube. An adjustment tube is threadedly mounted to the first outer threads on the valve shaft. When rotating the adjustment tube, the valve shaft is axially movable in the outer tube to control the gap between the first seal and the shoulder in the outer tube. The gap is changeable and communicates with the radial hole and the passage.

5 Claims, 10 Drawing Sheets

TIRE VALVE ASSEMBLY

BACKGROUND OF THE INVENTION

1. Fields of the Invention

The present invention relates to a valve assembly, and more particularly, to a tire valve assembly having an adjustable passage for easily control air volume introduced into the tire.

2. Descriptions of Related Art

The conventional tire valve assembly is connected to the tire and protrudes beyond the tire rim. An air pump is connected with the valve assembly to introduce air into the tire to let the tire to have desired pressure.

Figure 9:
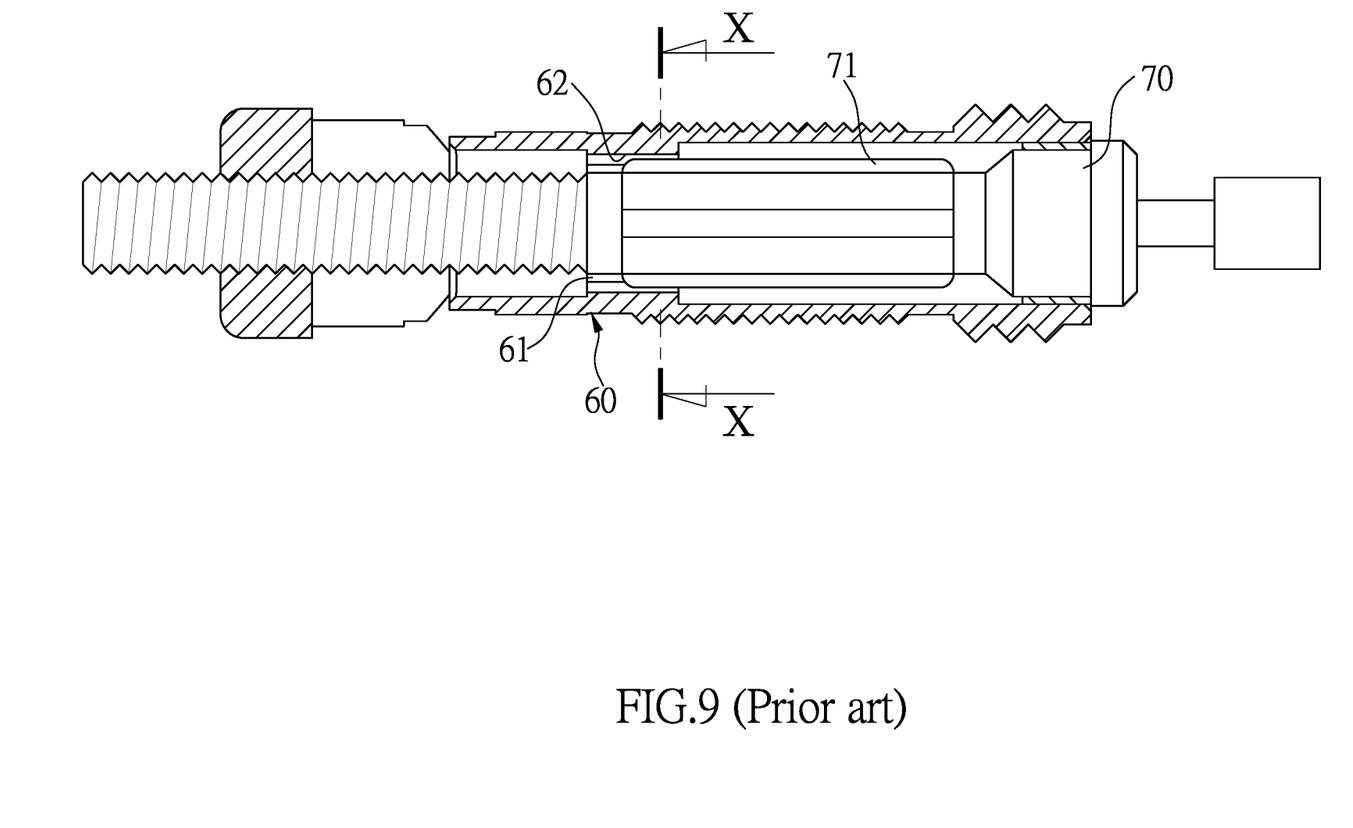
FIG. 9 is an axial cross sectional view of a conventional tire valve assembly.
Figure 10:
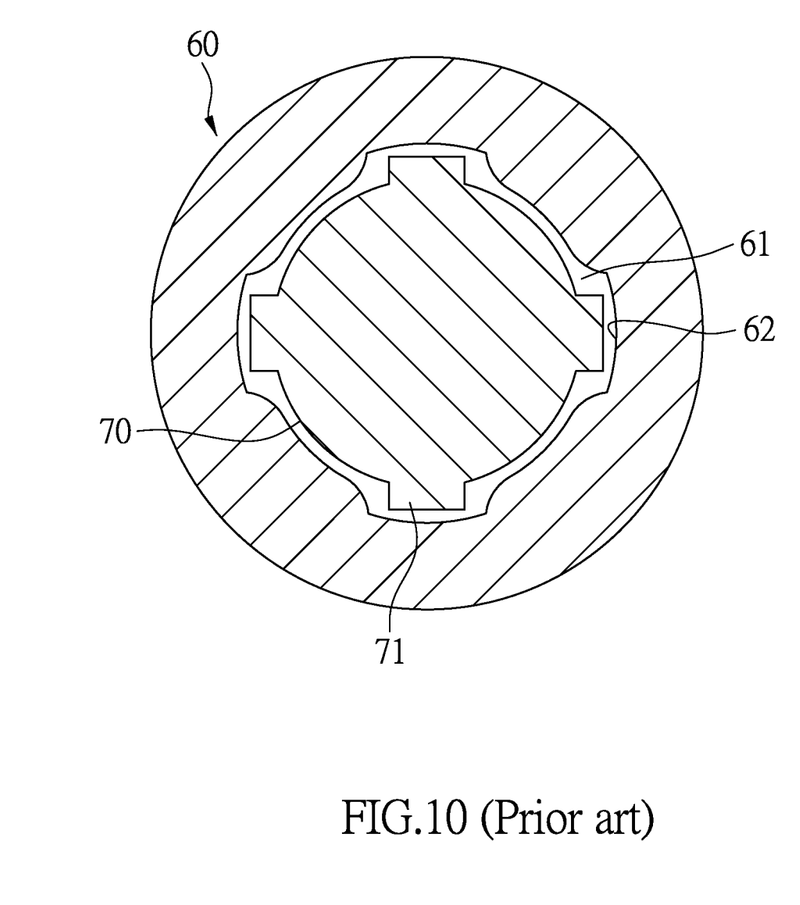
FIG. 10 is a transversely cross sectional view of a conventional tire valve assembly.

As shown in FIGS. 9 and 10, the valve assembly 60 includes a passage 61 through which air is introduced into the tire, and multiple grooves 62 are defined in the inner periphery of the passage 61. A valve shaft 70 is located in the passage 60 and the valve shaft 70 includes ridges 71 which are located within the grooves 62. When the valve shaft 70 is rotated and moved axially, the grooves 62 guide the movement of the ridges 71 so as to open or seal the valve assembly 60. However, when the valve shaft 70 moves, only a limited space is formed between the passage 61 and the valve shaft 70. Therefore, it takes time to inflate or to flat the tire due to small amount of air is allowed to pass through the limited space.

The present invention is intended to provide a tire valve assembly that provides two different sizes of the space to air to pass so as to eliminate the drawbacks mentioned above.

SUMMARY OF THE INVENTION

The present invention relates to a tire valve assembly and comprises a valve shaft having a first seal mounted to the first end thereof, and a passage is defined in the second end of the valve shaft. The vale shaft has a radial hole which communicates with the passage. A first groove is defined in the outer periphery of the valve shaft and a guide tube is engaged with the first groove. The guide tube includes at least one guide portion protruding from the outer periphery thereof. First outer threads are formed on the outer periphery of the second end of the valve shaft. An outer tube includes a first diameter section and a second diameter section respectively defined axially in the first and second ends thereof. A shoulder is formed in the outer tube and located between the first and second diameter sections. The first end of the valve shaft and the guide tube are inserted into the second diameter section from the first diameter section of the outer tube. At least one guide groove is defined in the inner periphery of the second diameter section and located corresponding to the at least one guide portion. The first outer threads are located beyond the second diameter section.

An inner tube includes second outer threads defined in the outer periphery thereof, and a connection member is connected to the first end of the inner tube. The second end of the inner tube extends through a rim and inserted into the first diameter section in the first end of the outer tube. The second outer threads are connected to the first diameter section. When rotating the inner tube, the connection member is moved toward the first end of the outer tube to clamp the rim. An adjustment tube has adjustment inner threads defined therein which are threadedly connected to the first outer threads of the valve shaft. When rotating the adjustment tube, the first seal on the valve shaft is moved to contact against the shoulder or is moved away from the shoulder so as to adjust a gap between the first seal and the shoulder. A communication path IS formed between the gap between the first seal and the shoulder, the radial hole and the second diameter section. The radial hole is sealed when the first seal contacts against the shoulder.

Preferably, the first diameter section includes connection inner threads, and an annular groove is defined in the inner periphery thereof. The connection inner threads are connected to the second outer threads of the inner tube. A second seal is mounted to the outer periphery of the inner tube and accommodated in the annular groove.

Preferably, a collar is mounted to the inner tube and contacts the first end of the outer tube. The collar contacts the rim.

Preferably, the collar is moved axially for a displacement of 8 mm when the inner tube is rotated relative to the outer tube.

Preferably, the outer tube includes connection outer threads defined in the outer periphery thereof. A cap is threadedly connected to the connection outer threads to seal the radial hole and the second diameter section.

The advantages of the present invention is that when rotating the adjustment tube, the valve shaft is axially movable in the outer tube to control the gap between the first seal and the shoulder in the outer tube. Therefore, when the gap is wider, the air can quickly enter into or released from the tire. When the gap is narrower, the air can slowly enter into or released from the tire for convenience of micro-adjust the tire pressure.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 8, the tire valve assembly of the present invention is to be connected with a rim 80, and comprises a valve shaft 10 which includes a first seal 11 mounted to the first end thereof, and a passage 12 is defined in the second end of the valve shaft 10. A radial hole 121 is defined through the wall of the first end of the valve shaft 10 and communicates with the passage 12. A first groove 13 is defined in the outer periphery of the valve shaft 10 and located next to the radial hole 121. A guide tube 14 is engaged with the first groove 13 and includes at least one guide portion 141 protruding from the outer periphery thereof. The second end of the valve shaft 10 has first outer threads 15 formed on the outer periphery thereof.

An outer tube 20 includes a first diameter section 21 defined axially in the first end thereof, and the outer tube 20 further has a second diameter section 22 defined axially in the second end thereof. The first and second diameter sections 21, 22 share a common axis. The diameter of the first diameter section 21 is larger than that of the second diameter section 22. A shoulder 23 is formed in the outer tube 20 and located between the first and second diameter sections 21, 22. The first end of the valve shaft 10 and the guide tube 14 are inserted into the second diameter section 22 from the first diameter section 21 of the outer tube 20. At least one guide groove 221 is defined in the inner periphery of the second diameter section 22 and located corresponding to the at least one guide portion 141. The first outer threads 15 are located beyond the second diameter section 22.

An inner tube 30 includes second outer threads 31 defined in the outer periphery thereof. A connection member 32 is connected to the first end of the inner tube 30, and the second end of the inner tube 30 extends through the rim 80 and inserted into the first diameter section 21 in the first end of the outer tube 20. The second outer threads 31 are connected to the first diameter section 21. A collar 33 is mounted to the inner tube 30 and contacts the first end of the outer tube 20. The collar 33 contacts the rim 80. When rotating the inner tube 30, the connection member 32 is moved toward the first end of the outer tube 20 to clamp the rim 80 between the connection member 32 and the collar 33.

An adjustment tube has adjustment inner threads defined therein which are threadedly connected to the first outer threads of the valve shaft. When rotating the adjustment tube 40, the first seal 11 on the valve shaft 10 is moved to contact against the shoulder 23 or is moved away from the shoulder 23 so as to adjust a gap between the first seal 11 and the shoulder 23. Therefore, a communication path is formed between the gap between the first seal 11 and the shoulder 23, the radial hole 121 and the second diameter section 22. When the first seal 11 contacts against the shoulder 23, the radial hole 121 is sealed.

Figure 1:
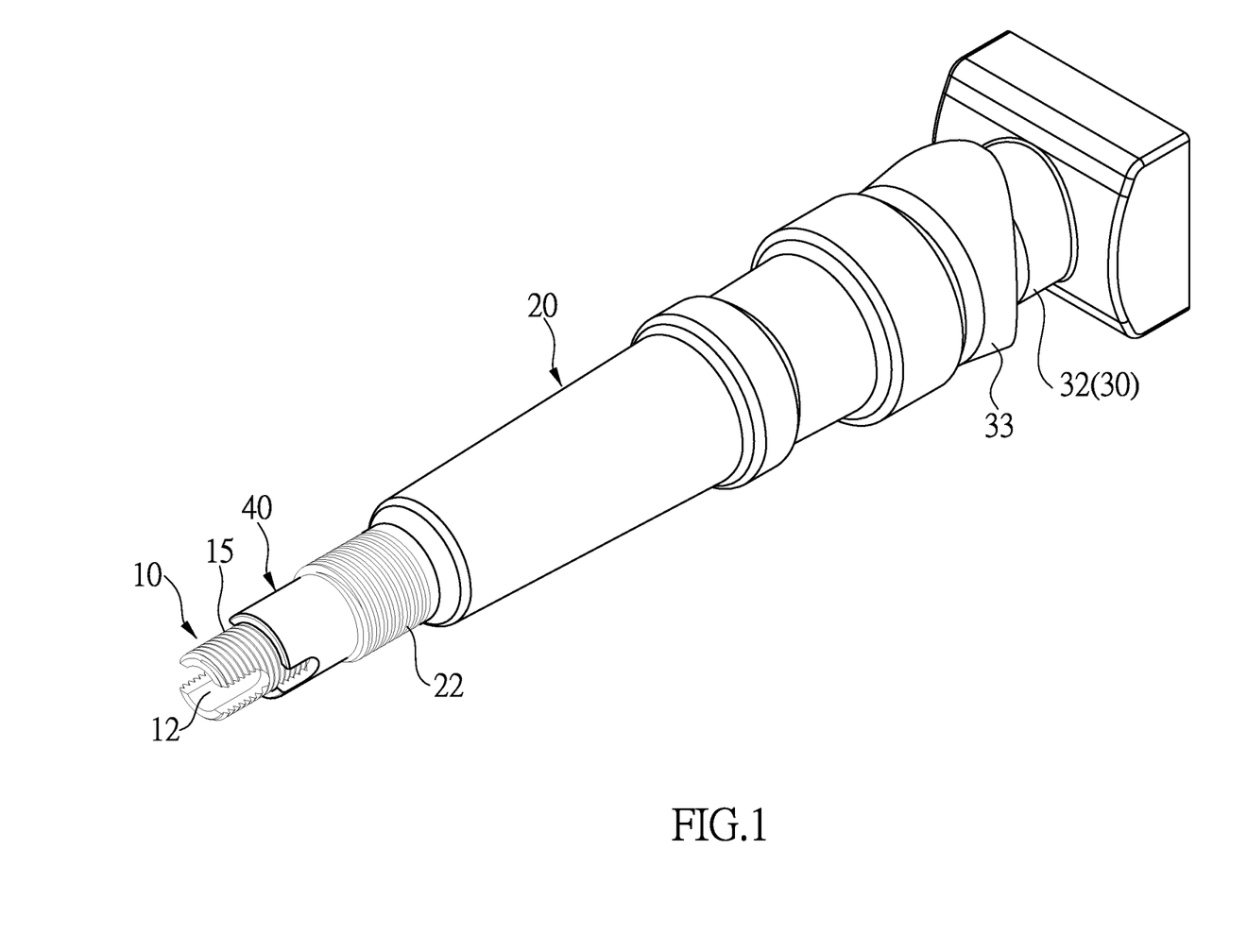
FIG. 1 is a perspective view to show the tire valve assembly of the present invention.
Figure 2:
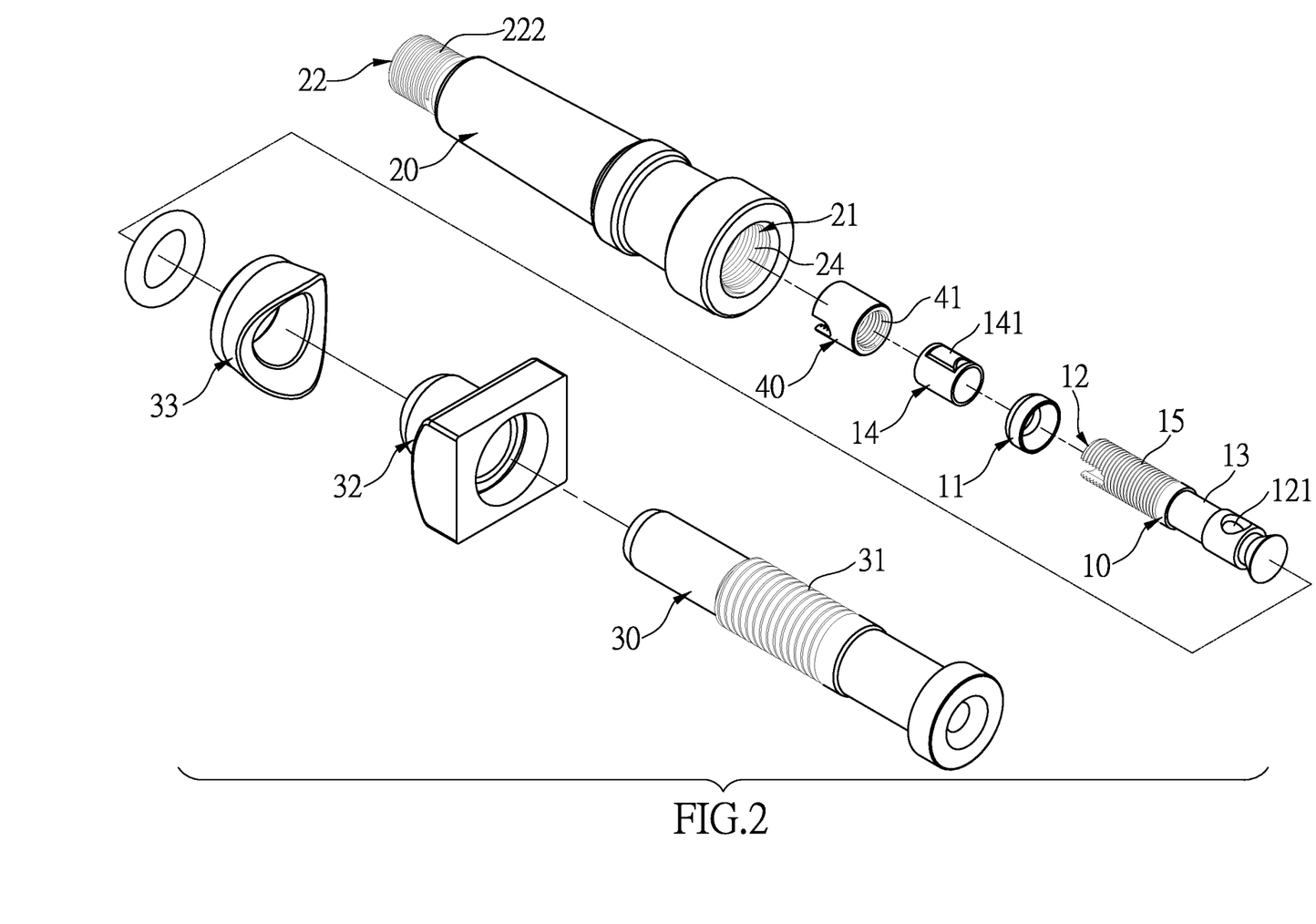
FIG. 2 is an exploded view of the tire valve assembly of the present invention.
Figure 3:
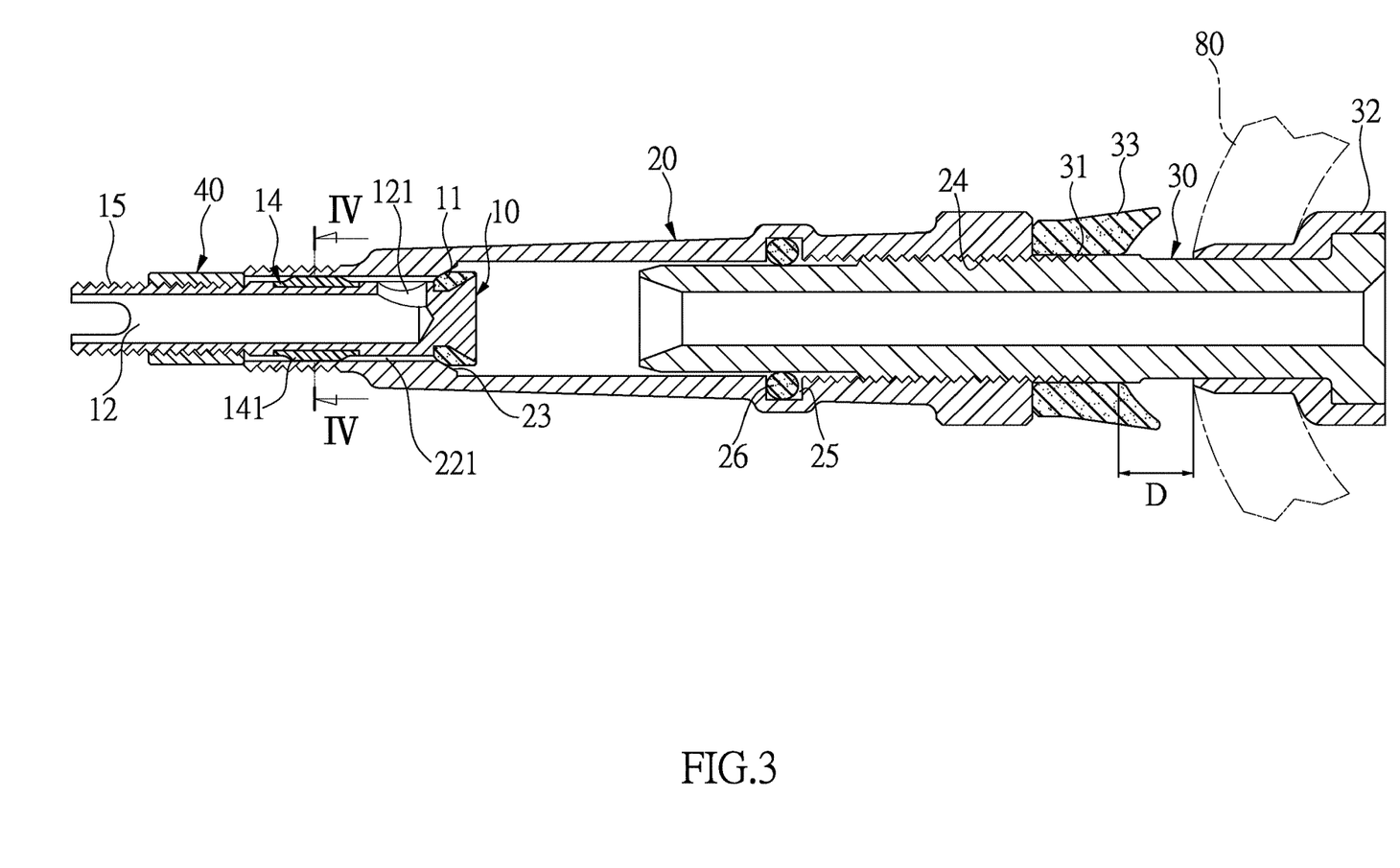
FIG. 3 is an cross sectional view of the tire valve assembly of the present invention.
Figure 5:
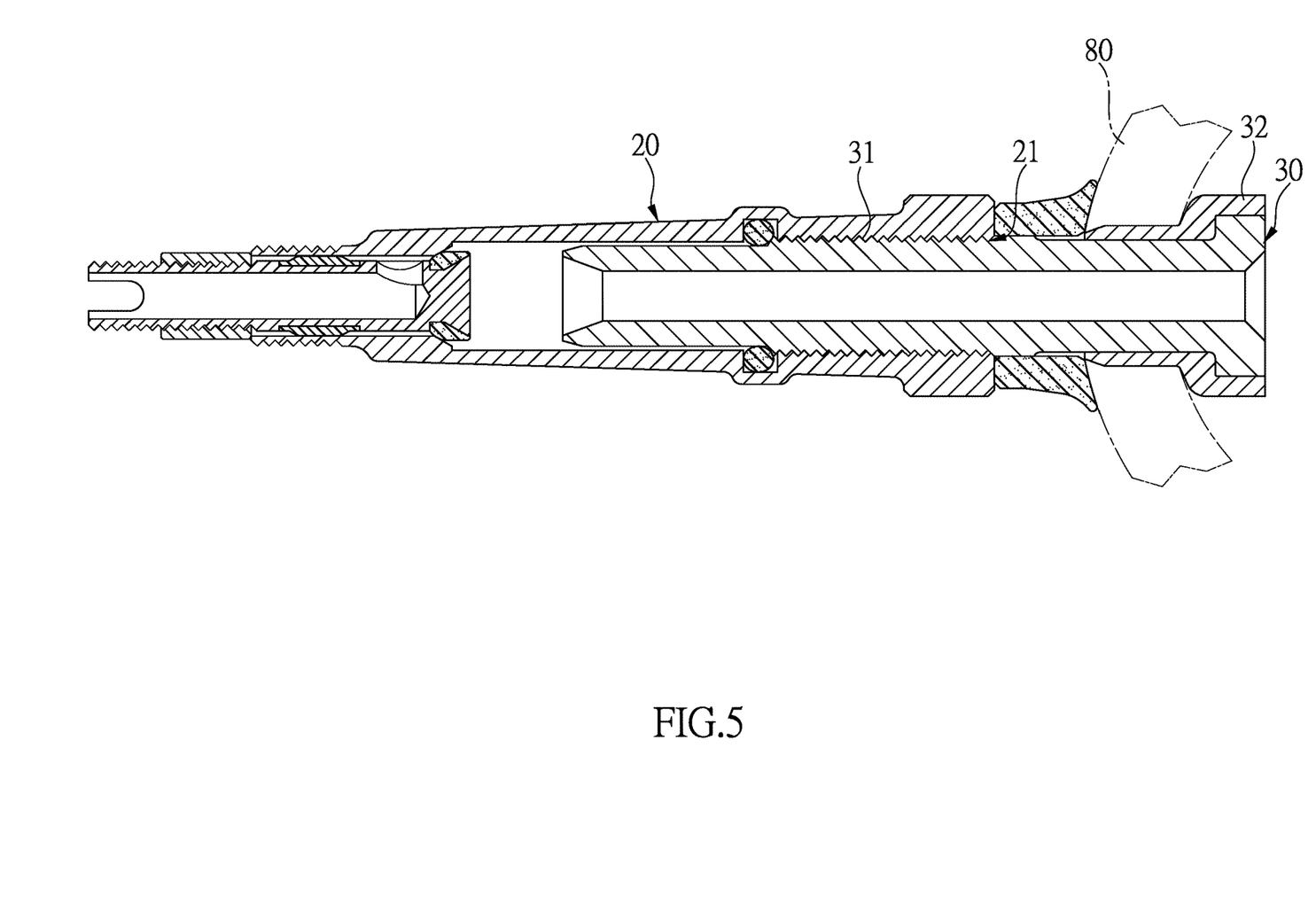
FIG. 5 is an cross sectional view to show that the tire valve assembly of the present invention is connected with a rim.

Specifically, the first diameter section 21 includes connection inner threads 24, and an annular groove 25 is defined in the inner periphery thereof. The connection inner threads 24 are connected to the second outer threads 31 of the inner tube 30. A second seal 26 is mounted to the outer periphery of the inner tube 30 and accommodated in the annular groove 25. The collar 33 is moved axially for a maximum displacement "D" of 8 mm when the inner tube 30 is rotated relative to the outer tube 2. As shown in FIGS. 3 and 5, the outer tube 20 includes connection outer threads 222 defined in the outer periphery thereof. A cap 50 is threadedly connected to the connection outer threads 222 to seal the radial hole 121 and the second diameter section 22.

As shown in FIGS. 3 and 5, when the tire valve assembly is installed to different rims 80 of different thicknesses, because the collar 33 is moved axially for a maximum displacement "D" of 8 mm by rotating the inner tube 30 relative to the outer tube 2, the tire valve assembly of the present invention can be used on different rims 80 of different sizes or thicknesses.

Figure 4:
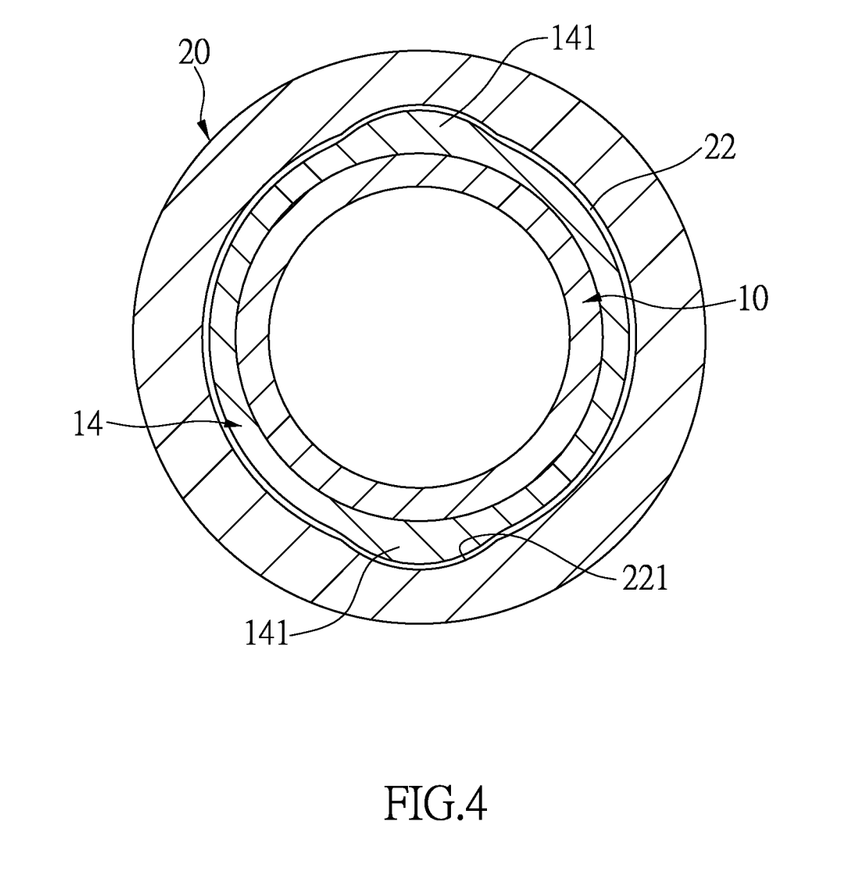
FIG. 4 is an cross sectional view, taken along line IV-IV of FIG. 3.
Figure 6:
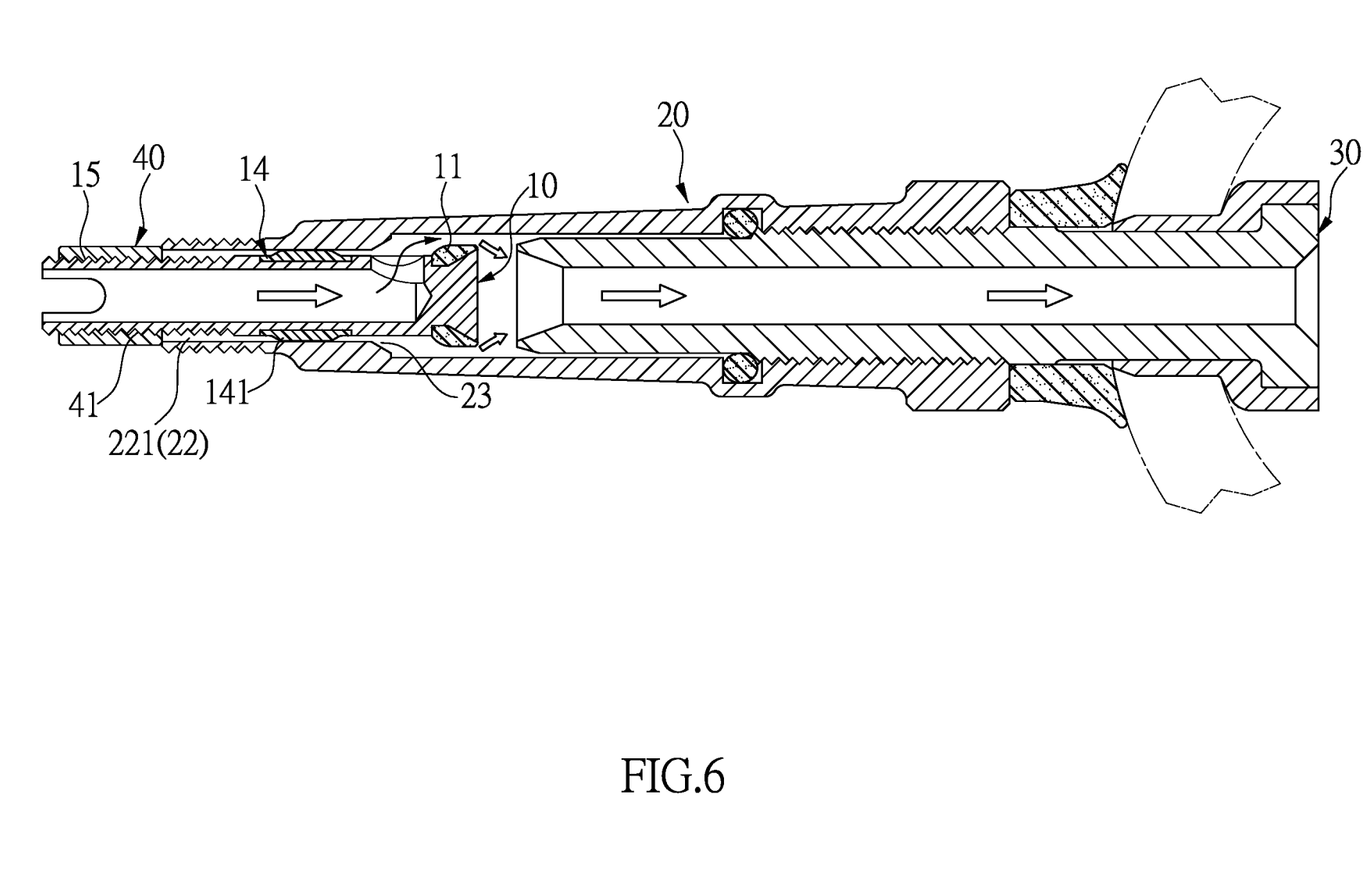
FIG. 6 shows that the gap is wider to allow high volume of air to pass through the gap.

As shown in FIG. 4, the guide tube 14 is accommodated in the first groove 13 that is located on the outer periphery of the valve shaft 10 so that the guide tube 14 does not occupy the space in the passage 12 of the valve shaft 10. Besides, as shown in FIG. 6, the at least one guide groove 221 of the second diameter section 22 of the outer tube 20 guides the at least one guide portion 141 of the guide tube 14 so as to adjust the axial movement of the valve shaft 10 by the threading action between the adjustment threads 41 and the first outer threads 15. When the first seal 11 is moved away from the shoulder 23, a high volume of air can pass through the communication path to quickly introduce air into the tire or to quickly release air from the tire.

Figure 7:
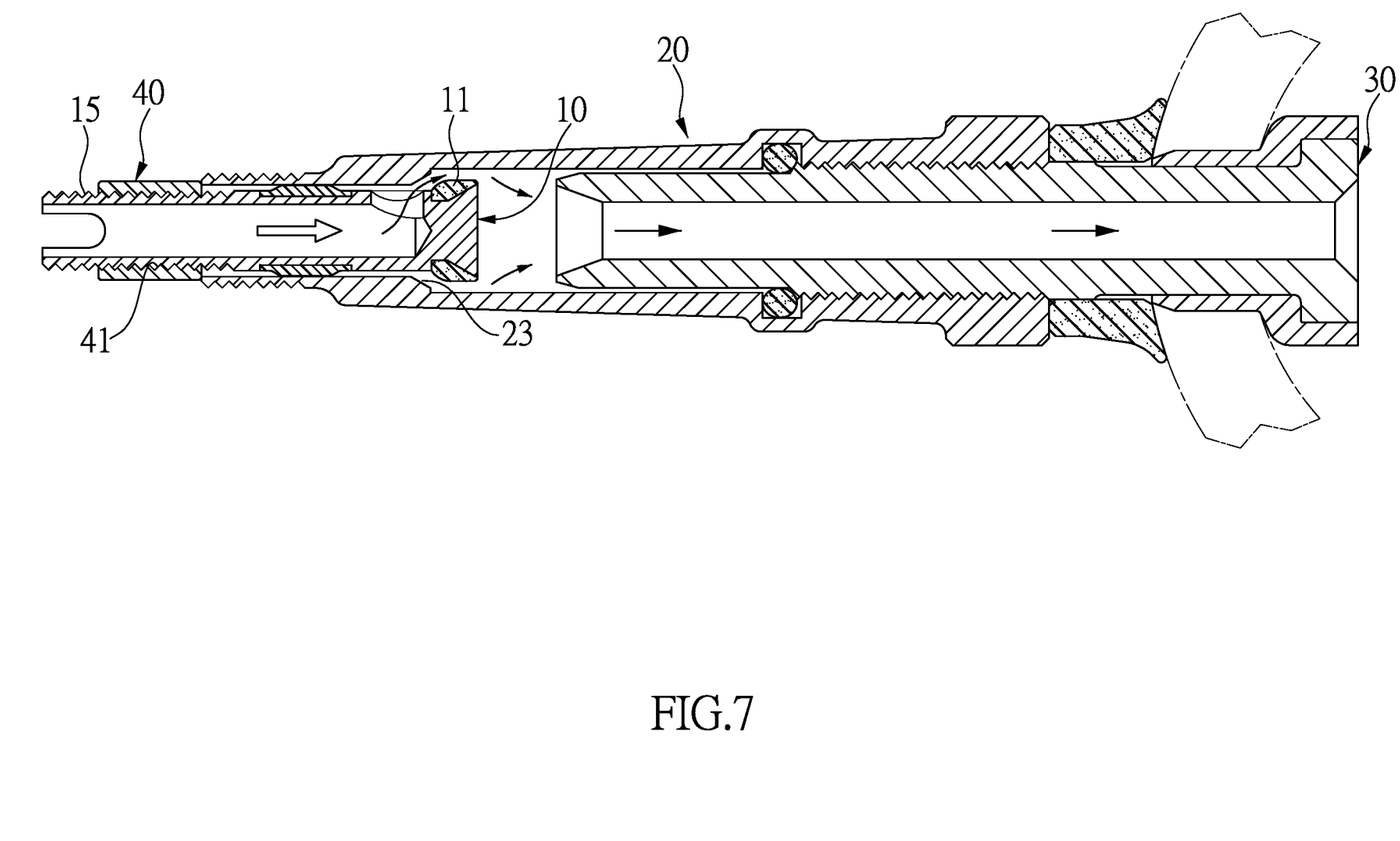
FIG. 7 shows that the gap is narrower to allow limited volume of air to pass through the gap.

As shown in FIG. 7, when introducing air into the tire or releasing air from the tire to a desired pressure in the tire, by the threading action between the adjustment threads 41 and the first outer threads 15, the first seal 11 is moved toward the shoulder 23, such that only limited volume of air can pass through the communication path to easily control the tire pressure.

Figure 8:
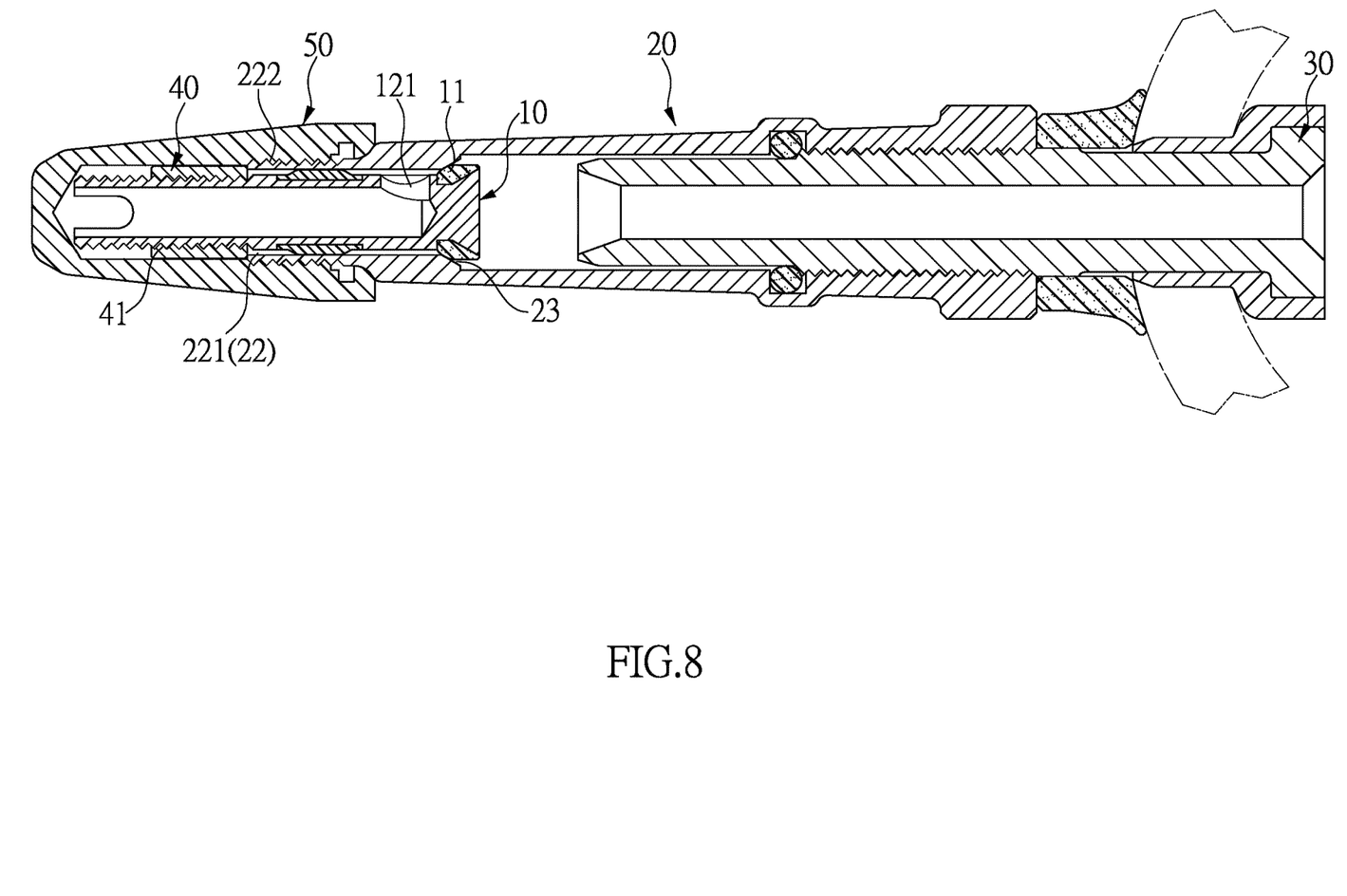
FIG. 8 shows that the radial hole and the second diameter section are sealed.

As shown in FIG. 8, after the tire pressure reaches the desired value, the first seal 11 is further moved to contact against the shoulder 23 to seal the radial hole 121, such that air is stopped from entering into or leaving out from the tire. The cap 50 is then threadedly connected to the connection outer threads 222 to seal the radial hole 121 and the second diameter section 22 and also to prevent foreign objects entering the valve shaft 10.

While we have shown and described the embodiment in accordance with the present invention, it should be clear to those skilled in the art that further embodiments may be made without departing from the scope of the present invention.

What is claimed is:

1. A tire valve assembly comprising:

a valve shaft having a first seal mounted to a first end thereof, a passage defined in a second end of the valve shaft, a radial hole defined through a wall of the first end of the valve shaft and communicating with the passage, a first groove defined in an outer periphery of the valve shaft and located next to the radial hole, a guide tube engaged with the first groove and having at least one guide portion protruding from an outer periphery thereof, first outer threads formed on the outer periphery of the second end of the valve shaft;

an outer tube including a first diameter section defined axially in a first end thereof, the outer tube having a second diameter section defined axially in a second end thereof, the first and second diameter sections sharing a common axis, a diameter of the first diameter section being larger than that of the second diameter section, a shoulder formed in the outer tube and located between the first and second diameter sections, the first end of the valve shaft and the guide tube inserted into the second diameter section from the first diameter section of the outer tube, at least one guide groove defined in an inner periphery of the second diameter section and located corresponding to the at least one guide portion, the first outer threads being located beyond the second diameter section;

an inner tube having second outer threads defined in an outer periphery thereof, a connection member connected to a first end of the inner tube, a second end of the inner tube adapted to extend through a rim and inserted into the first diameter section in the first end of the outer tube, the second outer threads being connected to the first diameter section, when rotating the inner tube, the connection member is moved toward the first end of the outer tube to be adapted to clamp the rim, and an adjustment tube having adjustment inner threads defined therein which are threadedly connected to the first outer threads of the valve shaft, when rotating the adjustment tube, the first seal on the valve shaft is moved to contact against the shoulder or is moved away from the shoulder so as to adjust a gap between the first seal and the shoulder, a communication path being formed between the gap between the first seal and the shoulder, the radial hole and the second diameter section, the radial hole being sealed when the first seal contacts against the shoulder.

2. The tire valve assembly as claimed in claim 1, wherein the first diameter section includes connection inner threads, and an annular groove defined in an inner periphery thereof, the connection inner threads are connected to the second outer threads of the inner tube, a second seal is mounted to the outer periphery of the inner tube and accommodated in the annular groove.

3. The tire valve assembly as claimed in claim 1, wherein a collar is mounted to the inner tube and contacts the first end of the outer tube, the collar is adapted to contact the rim.

4. The tire valve assembly as claimed in claim 3, wherein the collar is moved axially for a displacement of 8 mm when the inner tube is rotated relative to the outer tube.

5. The tire valve assembly as claimed in claim 1, wherein the outer tube includes connection outer threads defined in an outer periphery thereof, a cap is threadedly connected to the connection outer threads to seal the radial hole and the second diameter section.

\* \* \* \* \*